June 20, 1933. H. W. GOODALL 1,914,368
COUPLING FOR HOSE
Filed June 25, 1932
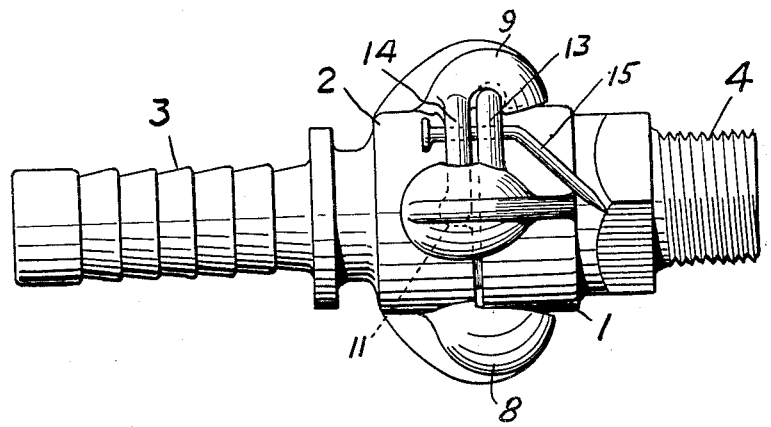
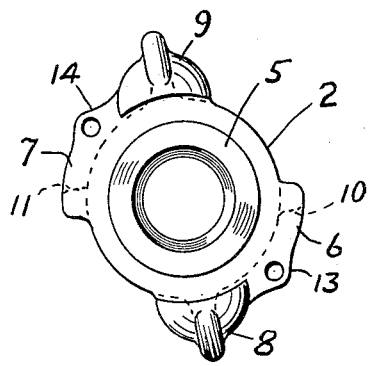 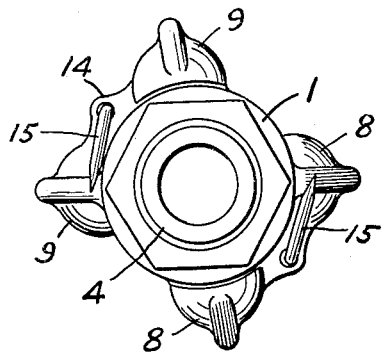
INVENTOR
Howard W. Goodall
BY
Augustus B. Stoughton
ATTORNEY
WITNESS:
Robt R Kitchel.

Patented June 20, 1933

1,914,368

UNITED STATES PATENT OFFICE

HOWARD W. GOODALL, OF ALDAN, PENNSYLVANIA

COUPLING FOR HOSE

Application filed June 25, 1932. Serial No. 619,196.

There are hose couplings comprising identical heads which are faced with rubber and provided with co-operating jaws which receive and enclose ribs, and which are coupled and uncoupled by relative movement of rotation. In use hose connected by such couplings is subjected to high pressure air or the like. The hose when uncoiled and subjected to pressure has a tendency to twist, and in twisting uncouples the heads of the coupling causing considerable inconvenience and some danger. Moreover, when in a state of vibration such couplings are likely to become uncoupled.

The principal object of the present invention is to prevent such accidental uncoupling of the heads of the coupling. Another object of the invention is to accomplish the result indicated by simple, reliable and comparatively inexpensive means.

Other objects of the invention will appear from the following description at the end of which the invention will be claimed.

Generally stated, the invention comprises a hose coupling including identical heads each faced with rubber and each having two ribs and two cooperating jaws which interlock with and cover the ribs by a movement involving rotation of the heads and compression of the rubber, and each head having outward extensions uncovered by the jaws and adapted when the heads are coupled to cooperate with a locking device for opposing uncoupling of the heads by torsion action of the hose or by vibration thereof.

The invention also comprises the improvements to be presently described and finally claimed.

In the following description reference will be made to the accompanying drawing forming part hereof and in which Figure 1 is a side elevation of a coupling embodying features of the invention.

Fig. 2 is an end view of the head shown at the left in Fig. 1, and

Fig. 3 is an end view looking toward the left in Figure 1.

Referring to the drawing, 1 and 2 are identical heads although their attaching means differ. The attaching means 3 of the head 2 is adapted to receive a hose, and the attaching means 4 of the head 1 is adapted for mounting through, for example, the wall or outlet of a compressor. A description of one of the heads will suffice. The head 2 is faced with rubber as at 5, and the head 2 is provided with two cooperating jaws 8 and 9 and with two ribs 6 and 7 which are covered by or enclosed in spaces in the jaws 8 and 9 when the heads are coupled. The ribs are provided with projections 10 and 11, and these projections take into cavities 12, Figs. 4 and 5, in the interior of the jaws. The heads are assembled by compressing the rubber faces 5 and by turning the ribs 6 and 7 into the spaces in the jaws until the projections 10 and 11 take into the cavities 12.

Referring to Figs. 1-3, 13 and 14 are perforated outward extensions provided on the heads and adapted when the heads are coupled to receive a locking device for opposing uncoupling of the heads by torsion action of the hose or by vibration. The locking device may be pretty much any kind of a pin, and it is shown as a bent nail 15, although a piece of wire or even a pin of stout wood will suffice.

The term outward extension means a part which is exposed when the ribs 6 and 7 are covered up by the jaws.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A coupling comprising identical heads each faced with rubber and each having two ribs and two cooperating jaws which interlock with and cover the ribs by a movement involving rotation of the heads and compression of the rubber, and each head having two perforated outward extensions on its ribs, uncovered by the jaws and adapted when the heads are coupled and the ribs are covered to receive a locking device for opposing uncoupling of the heads by torsion action of the hose and by vibration.

2. A coupling comprising identical heads each faced with rubber and each having two ribs and two cooperating jaws which interlock with and cover the ribs by a movement involving rotation of the heads and compression of the rubber, each head having two perforated outward extensions, each connected to a rib and located so as to be uncovered by the jaws when the jaws cover the ribs, and a locking device separate from said heads adapted for insertion into said perforations for opposing uncoupling of the heads by torsion action of the hose and by vibration.

HOWARD W. GOODALL.